UNITED STATES PATENT OFFICE.

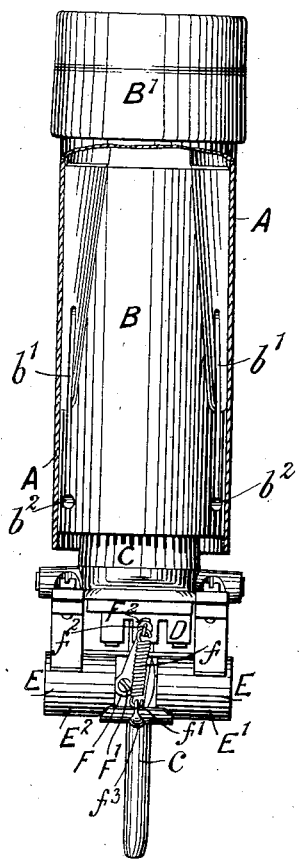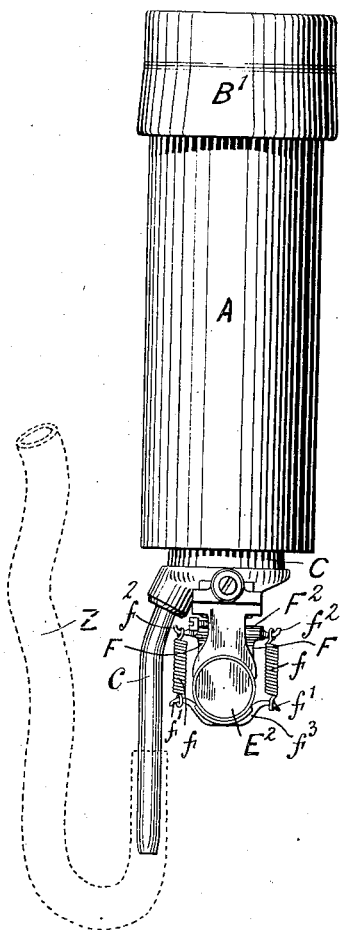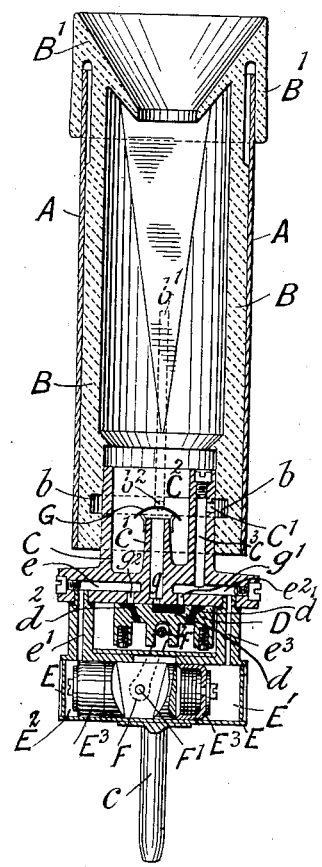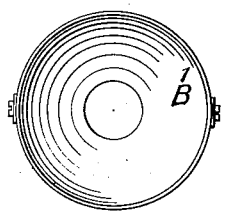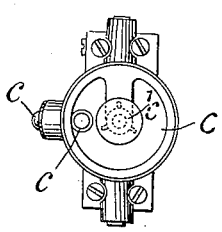

ROBERT WALLACE, OF CASTLE DOUGLAS, SCOTLAND.

MILKING APPLIANCE.

No. 814,487. Specification of Letters Patent. Patented March 6, 1906.

Application filed December 28, 1904. Serial No. 238,614.

*To all whom it may concern:*

Be it known that I, ROBERT WALLACE, agricultural-implement maker, a subject of the King of Great Britain and Ireland, and a resident of Castle Douglas, Kirkcudbrightshire, Scotland, have invented certain new and useful Improvements in Milking Appliances, (for which an application for a patent has been filed in Great Britain, No. 5,542, bearing date of March 7, 1904,) of which the following is a specification.

This invention has reference to improvements in and relating to milking appliances; and its novel features essentially comprise the application of a motor or engine to each teat-cup to control the pulsating action round the teat, and which only requires one suction-tube for each teat, and the improvement of the action of the upper part of the teat-receiving cup, and in order that my said invention and the manner of carrying same into practice may be properly understood I have hereunto appended a sheet of explanatory drawings, in which—

Figure 1 is an external elevation of a teat-cup and suction-fittings as constructed in accordance with my improvements. Fig. 2 is a plan view corresponding to Fig. 1, but with the teat-cup and outer casing removed. Fig. 3 is an elevation at right angles to Fig. 1, but showing the outer metal tube in section to illustrate the rubber grooved tube; and Fig. 4 is a plan view corresponding to Fig. 3, while Fig. 5 is a view corresponding to Fig. 3, but showing all the parts in sectional elevation.

Referring to the drawings, the teat-cup comprises, as usual, a central rubber or like tube or diaphragm B, which fits onto each teat of the cow and is connected by a rubber or flexible pipe Z to a portable pail or vessel subjected to vacuum or suction action. This central tube B is formed with a grooved horizontal ring $b$, Fig. 5, on its inner surface and a series of vertical or longitudinal grooves $b'$ on its outer surface, and communicating holes or apertures $b^2$ are formed at spaced distances apart between the groove $b$ on the inner and grooves $b'$ on the outer surface. An outer tube or jacket A, of aluminium or other suitable material, is fitted outside the rubber tube B.

The motor or engine is fitted inside the lower part of the central rubber tube B and preferably consists of a hollow metal or other vessel C with a tube or channel $C^3$, having a hole or aperture $C'$ in communication with the ring-groove $b$ on rubber tube B and having a single tube $c$ with a rubber or like connection Z to the milk-receiving pail and a tube $c'$ leading from hollow space $C^2$ to a three-ported slide-valve D with ports $d$ $d'$ $d^2$ in communication with the atmosphere and vacuum and having connections through the ports $g$ $g'$ $g^2$ in bottom of vessel C with the channels $e$ $e'$ and $e^2$ $e^3$ to the ends $E^2$ $E'$ of a cylinder or cylinders E, fitted within a double-ended or duplex connected piston $E^3$, (shown partly in section,) the channel $e^2$ also communicating with the vertical channel $C^3$.

The slide-valve D is preferably operated by levers F, fulcrumed at F' to the central part of the piston $E^3$ and connected at their other ends by a cross-head $F^2$. The cross-head $F^2$ has hooked ends $f^2$, to which are attached the ends of recoil-acting helical spring $ff$, having their other ends attached to hooked ends $f'$ on a fixed cross-head $f^3$. By this means when the valve D is opening—say by its port $d$—the ports $g$ $g'$ of vessel C communication is established through the tube $c'$ with the source of suction or vacuum action, and suction is established through the channel $C^3$, orifice $C'$, and ring-groove $b$ with the grooves $b'$ in teat-cup B, and the end $E'$ or cylinder E is also under suction, while at same time atmospheric air enters the opposite end $E^2$ of cylinder by the ports $d^2$ $g^2$ and channels $e$ $e'$. The suction thus draws the piston $E^3$ to opposite end of cylinder, and this movement causes the cross-head $F^2$ of levers F to act on the valve D to shift it to the opposite end to put its port $d$ in communication with ports $g$ $g^2$ and opposite end $E^2$ of cylinder. The other end $E'$ of cylinder and the channel $C^3$ then become in turn in communication with the atmosphere through the ports $g'$ and $d'$ and channels $e^2$ $e^3$ to act on teat-cup to produce the pulsating action and also shift the valve to opposite end, and this cycle of operations goes on in alternate sequence.

A hood or cowl G with open sides is preferably fitted over the top of tube $c'$ to baffle or prevent ingress of milk to motor-valve.

The rubber-grooved tube B is carried some distance above the outer annular sleeve A and is doubled or folded over at top B', so as to present a mouth of an oval or round collapsible shape into which the teat of the cow is inserted. By this means the milk is drawn away by continuous suction action to the milk-receiving pails, and a pulsating or intermittent action is simultaneously produced around the teat, while the discharging of air into the interior of cup facilitates the discharging of the last traces of milk from cup through the tube Z to the milk-receiving vessel.

I claim as my invention—

1. In a milking appliance, the combination of a group of individual double-walled cups, a separate vacuum-motor secured to each of said cups for operating the same, and means for maintaining the suction within each cup at a continuous vacuum, the inlet of atmospheric air through the motor to the outer chamber of the cup producing a pulsating action around the teat.

2. In a milking appliance, the combination of an individual double-walled cup with a vacuum-motor secured to such individual cup, and a single suction-tube connected to the motor and the milk-receiving portion of said cup.

3. In milking appliances the combination of a cup, a vacuum-motor discharging its air into center of cup, with the rubber tube formed with vertical grooves and horizontal groove, and surrounded by an outer metal shell.

4. In milking appliances the combination of an outer metal tube, and an inner rubber tube having longitudinal and horizontal grooves, with means for communicating suction and atmospheric action alternately thereto.

In testimony whereof I have signed my name to this specification in the presence of two subscribing witnesses.

ROBERT WALLACE.

Witnesses:
R. C. THOMSON,
WM. RUTHERFORD.